F. J. TROLL.
SCALE.
APPLICATION FILED AUG. 7, 1919.
1,354,447.
Patented Sept. 28, 1920.
2 SHEETS—SHEET 1.
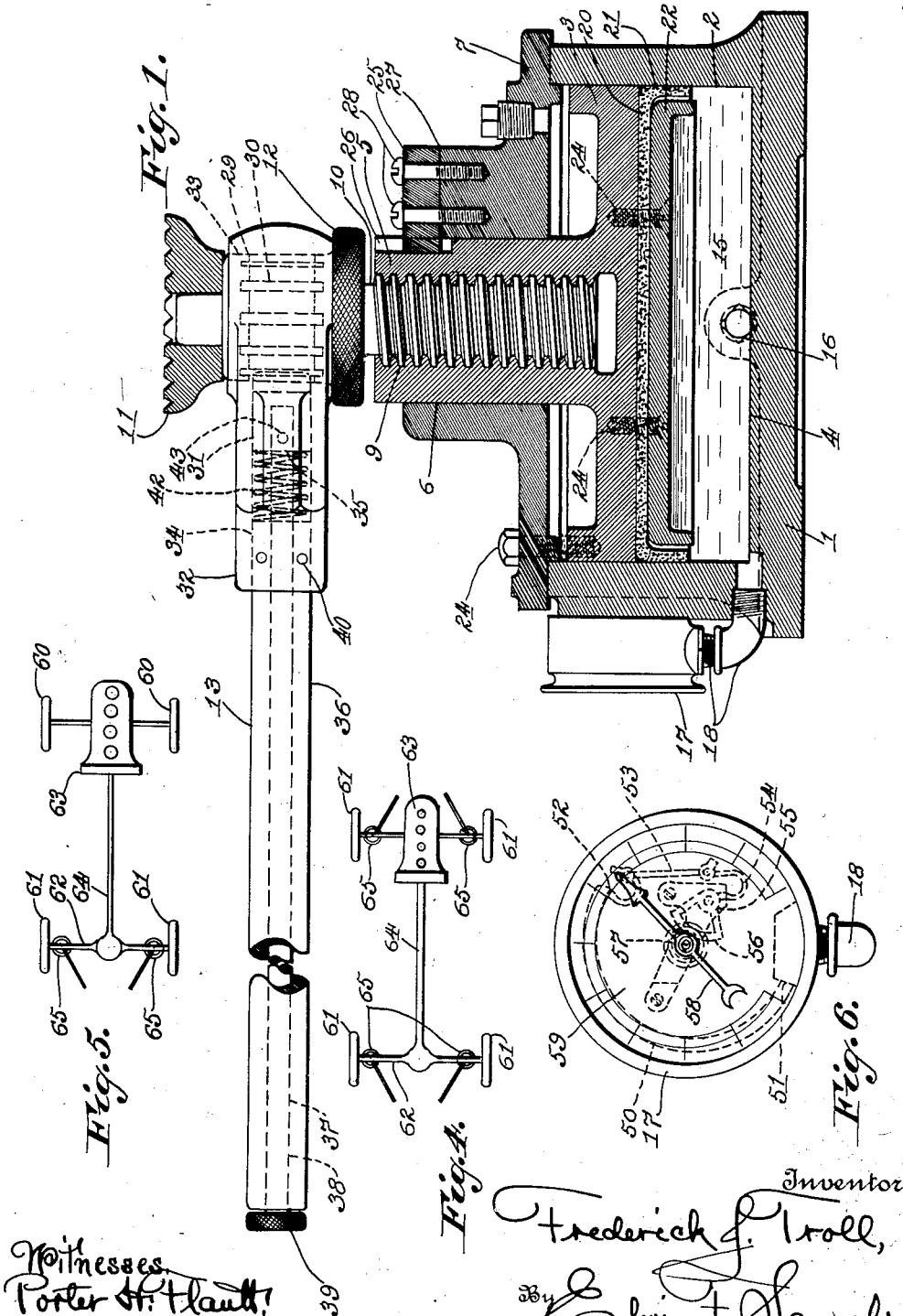

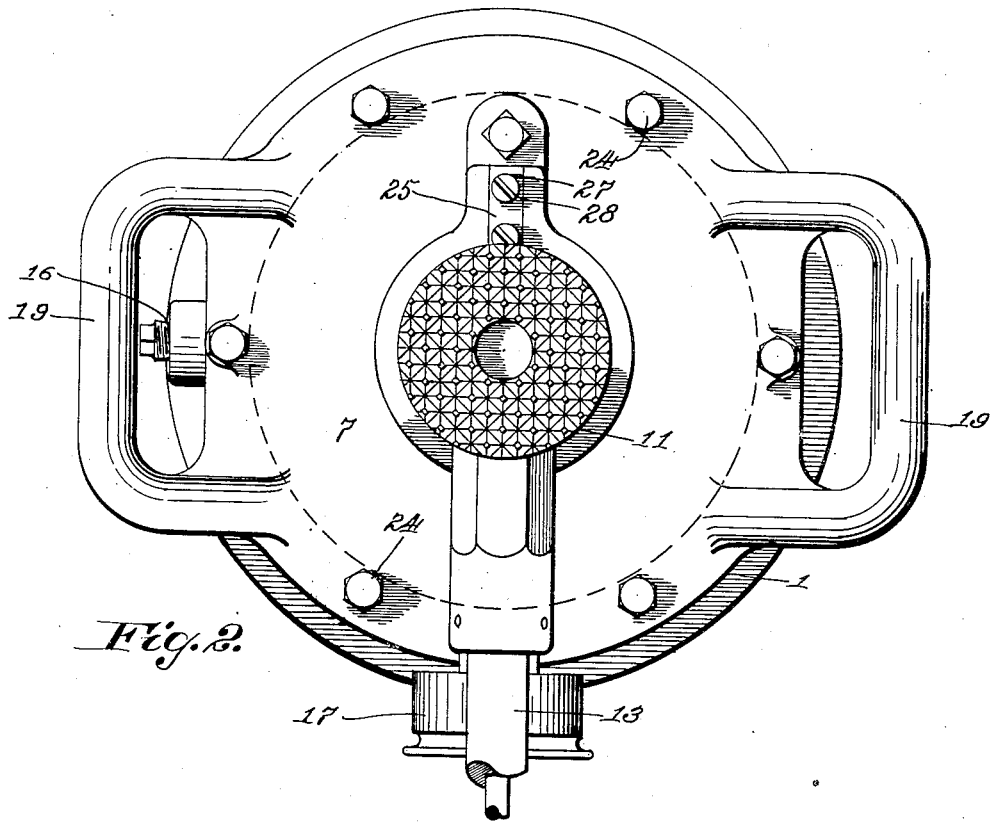
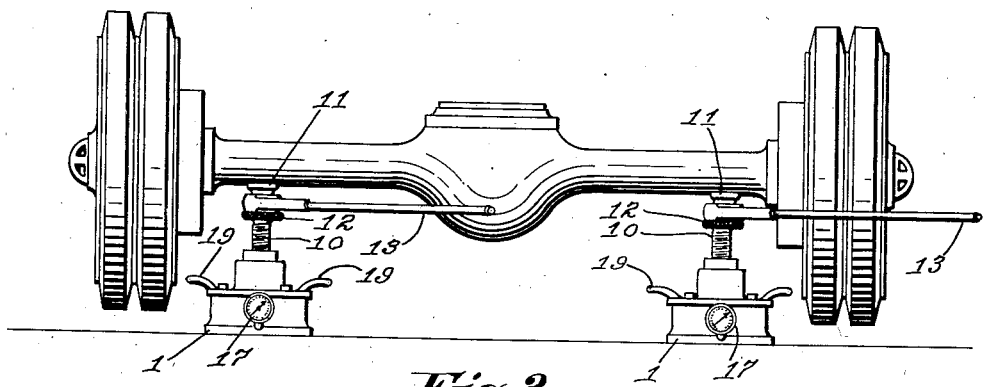

UNITED STATES PATENT OFFICE.

FREDERICK J. TROLL, OF BALTIMORE, MARYLAND, ASSIGNOR TO THE LOADOMETER COMPANY, A CORPORATION OF DELAWARE.

SCALE.

1,354,447.  Specification of Letters Patent.  Patented Sept. 28, 1920.

Application filed August 7, 1919. Serial No. 315,834.

*To all whom it may concern:*

Be it known that I, FREDERICK J. TROLL, a citizen of the United States of America, residing in the city of Baltimore, State of Maryland, have invented certain new and useful Improvements in Scales, of which the following is a specification.

In order to prevent destruction of road surfaces and foundations by modern traffic, it has become necessary to limit the pressure per unit of area that may be applied to the roads by vehicle tires, or, more particularly, to limit the weight consisting of load and vehicle per inch of tire width. Laws providing for this have been passed in various States, and such protection is essential wherever good roads are to be maintained in the face of heavy traffic. The adoption of such laws has probably been somewhat retarded on account of the difficulties incident to inspection. Where violation is merely suspected and can only be suspected until actually proved, to compel the driver of a heavily loaded vehicle to depart from his intended route in order that the vehicle and load might be weighed would work extreme hardship and injustice.

The inventor seeks to overcome this difficulty by supplying a convenient and dependable means for determining the bearing pressure on the tires at any time when and place where such a test may be desired. This apparatus may be used either by the operator of the vehicle to avoid violation of the law or by the authorities, as traffic officers and the like, to detect such violations, the same being conveniently transportable, so that it may be carried by the traffic officer in his machine, and comparatively inexpensive, so that it may logically become a part of the regular equipment as are the speedometer and other testing and indicating devices, air gages, jacks, etc.

More particularly, the device consists in the combination of a jack or lifting means by which a portion of the vehicle may be lifted with a weight or pressure indicator.

In the preferred form of the invention I use a mechanical jack in combination with a hydraulic weighing device and a pressure indicating means which may be calibrated to read in terms of the weight lifted by the jack.

Determination of the weight on any wheel per unit of width of the tire may be accomplished in various ways by use of the weighing device of the invention. The obvious method is to lift one wheel by means of the jack element of the combination, thus transferring the load on the wheel to the weighing device. Under these circumstances it will be obvious to those acquainted with the principles of mechanics that the weight indicated by the gage is not the exact weight which rests on the tire. Ordinarily the wheel will be raised as in the regular practice in changing tires, by placing the weighing device under the axle just inside the wheel after the manner of operating an ordinary jack and the actual load on the tire must be calculated by measuring the moment arms of the downward pressure at the center of the tire which is lifted and the upward supporting force at the weighing device, respectively, about the center of the opposite wheel on the same axle, and applying the usual formula to arrive at the unknown force, *i. e.*, the weight or downward pressure at the center of the tire of the wheel which has been lifted. This would, however, raise fine questions as to the accuracy of measurements, etc., affecting the accuracy of the result. Another practical method of determining the bearing pressure or weight per unit of width on the tires is by using two weighing units by means of which the entire weight on, and of either axle, including the wheels, is determined at one time by jacking up both wheels, reading the pressure gage on each weighing member and dividing the reading by the tire width; or four weighing units may be used, all four wheels being supported at one time, each reading being divided by the tire width to give the bearing pressure per inch of tire width. The variation as to the individual wheels would of course depend on the placing of the load. This may be used to give the weight of the entire vehicle and its load, which would be the same quantity determined if the vehicle were driven on a scale like that used in weighing coal or ice, which is the only competing apparatus now utilized in this connection.

In the accompanying drawing I have illustrated a weighing device embodying the features of my invention and various methods of applying the same in the determination of the bearing pressure on the tires of road vehicles.

In the drawings Figure 1 is a vertical central section of a weighing device constructed in accordance with my invention, certain parts being shown in elevation.

Fig. 2 is a plan of the same.

Fig. 3 is an elevation showing the rear axle of a truck looking from the back, with two of my weighing units in the process of determining the bearing pressure on the rear tires, both ends of the axle being raised by the jacking element of the weighing device.

Fig. 4 is a diagrammatic plan of a road vehicle to which four of the weighing devices are applied.

Fig. 5 is a similar diagrammatic view showing the use of two weighing devices in accordance with my invention.

Fig. 6 is a detail elevation of the gage.

Referring to the drawings by numerals, each of which is used to indicate the same or similar parts in the different figures, the weighing unit illustrated, particularly in Figs. 1 and 2, includes a base or pot 1 in which is formed a fluid pressure or hydraulic cylinder 2 coöperating with which is a piston 3. The cylinder has its head or closed end 4 at the bottom, and the piston has a piston rod or shank 5 working in a suitable guide or bearing 6 in the cap 7, and this shank 5 has a central axial threaded aperture 9 which coöperates with and receives the threaded jack-screw shaft 10. Other features of the jack include a head 11 swiveled on the shaft 10, a knurled collar 12 secured to the shaft, and a ratchet and pawl element 13 by which the shaft is rotated in the operation of the jack.

Referring more particularly to the details of the device, the cylinder 2 contains a fluid 15 which is preferably a heavy oil which is supplied to the cylinder in any convenient way as through the screw plug opening 16. The fluid pressure is indicated in any preferred units by means of a pressure gage 17 connected to the cylinder by suitable fittings 18. This gage will be more particularly described.

The base 1 is also provided with suitable handles 19 for manual engagement in placing, removing and packing the device. The piston has leak preventing means or packing in the form of a soft washer or disk 20 which as shown is of inverted cup shape having its edges 21 turned so that they lie flat against the cylinder walls. This packing member is held in position by a metal washer or disk 22 which as shown is similarly formed, the same being in turn secured to the piston by a suitable means as screws 24. The cap 7 is secured to the cylinder or pot by means of cap screws 24 which pass through the cap and are seated in the cylinder wall. The rod or shank 5 is held in a guide or bearing 6 in the cap in which it may slide, and rotation of the piston and its shank in the guide and cylinder is prevented by means of a key 25 which enters a key-way 26 in the shank and is secured to the cap, being seated in a radial slot 27 therein and held by means of screws 28.

The knurled collar 12 is for use in turning the screw-shaft independently of the ratchet, as in raising the screw to the position in which it engages the load. The ratchet mechanism 13 consists of a ratchet gear 29 formed on the screw shaft. This gear, as shown, has a series of notches or slots 30 to receive a sliding pawl or bolt 31. The pawl is mounted to slide in a rotating or oscillating carrier 32 which is apertured at 33 to receive the ratchet gear. The pawl 31 is carried in a barrel or elongated opening 34 which opens into the aperture 33 surrounding the gear 29. The pawl is shouldered at 35, and the barrel 34 is closed back of the shoulder by the insertion of a lever arm 36 for actuating the pawl. This lever arm has a central longitudinal opening or bore 37 in alinement with the axis of the barrel 34, and in this barrel, extending the length of the arm, is a control rod 38 having at the rear end a button 39 by means of which it may be operated when desired. The lever arm 36 is fastened in the carrier by means of pins or rivets 40 and the pawl is thrust forward against the gear by means of a spiral spring 42 in the barrel which bears against the end of the lever arm 36 and against the shoulder 35 on the pawl, the pawl being in turn fastened to the forward end of the rod 38 by a pin or rivet 43. As shown, the end of the rod is inserted in an opening in the pawl and the shoulder 35 is in fact the rear surface of the pawl, the reduced portion back of the shoulder being a part of the rod 38. The pawl operates to turn the screw by engagement with the ratchet notches during the forward stroke of the arm, the back stroke being without effect on the position of the screw because the pawl throws it out of engagement. The bore or barrel 34 is made of circular cross-section, and to reverse the action of the lifting means, the pawl is withdrawn by a pull on the button 39 and rotated by manual engagement of the same button to reverse position.

The construction of the gage 17 is shown in Fig. 6, though all these details and the details of the jack are not considered material to the invention. The type of gage illustrated is a hollow metal band or flat tube 50 bent in the form of an arc. One end of this tube is open and connected to the fittings 18 inside the gage box at 51. The other or free end 52 is closed and connected by a link 53 to an arm 54 pivoted at 55 and carrying a segment 56 on the opposite side of the pivot. This segment meshes with a small gear 57 on the shaft of the indicating hand 58 moving over a calibrated face plate 59. The gage may be calibrated in pounds pressure of the fluid in the cylinder, but is preferably calibrated in terms of pounds weight supported by the jack or lifting member.

Figs. 4 and 5 show diagrammatically the chassis of a road vehicle or rather the front wheels 60, rear wheels 61, rear axle 62, engine casting 63, shaft 64. In Fig. 4 I have illustrated the application of four of my raising devices 65, two of them under the rear axle and two under the front axle at convenient points of engagement adjacent each wheel. When thus applied the weight on each wheel is obtained by reading the corresponding gage and the weight per unit of width for each wheel is obtained by the obvious method of dividing the weight by the width of the tire in inches.

By the use of two of the weighting units, as indicated in Fig. 4, the same or nearly the same figures may be obtained in separate operations at the front and rear and similarly treated, *i. e.*, the indicated weights on any corresponding wheel divided by the tire width.

Otherwise a single weighing unit may be used and the bearing pressure per unit of width for each tire obtained by jacking the wheels in turn and figuring the weight borne by each wheel according to a well known formula, that is, the distance from the point of weighing to the center of the opposite tread being $(a)$, the distance between the centers of treads being $(b)$, the weight indicated by the weighing unit being $(y)$, and the weight on the wheel lifted being $(x)$; then $$(a) \times (y) = (b) \times (x), \text{ or } \frac{(a)}{(x)} = \frac{(b)}{(y)}.$$

The values of $(a)$, $(b)$ and $(y)$ being known, the value of $(x)$ can obviously be obtained. This is then divided by the tire width. The total weight may obviously be determined by adding the weights indicated at the four wheels.

Such inspection relates most particularly to motor trucks, though the law applies to horse-drawn vehicles.

The desired number of weighing units as determined by the authorities being carried in the traffic officer's machine, when a vehicle is encountered which is under suspicion as exerting a bearing power on the tires greater than that allowed by the regulations, the offending vehicle is stopped, the lifting units are placed under it as already described, and the machine is lifted either as a whole or by the front and rear separately, or as to each wheel as already indicated, the data as to bearing thrust or weight per unit of width of the tires being thus immediately accessible to the officer who is thus enabled to make the arrest or record the offense for further adjudication, having the necessary evidence, or release the vehicle acquitted of suspicion as the case may be.

I have thus described a weighing device embodying my invention specifically and in detail in order that its nature and operation may be clearly understood; however, the specific terms herein are used descriptively rather than in a limiting sense, the scope of the invention being defined in the claims.

What I claim and desire to secure by Letters Patent is:

1. A weighing device for obtaining the bearing pressure on vehicle tires consisting of a cylinder and piston with means for indicating the fluid pressure in the cylinder, a jack, means for applying the weight lifted by the jack to the cylinder and piston to contract the piston space, said means including a shank, a weight supporting member for the jack having a screw-threaded engagement with said shank, the axis of the screw being parallel to the path of the piston, ratchet means for turning the screw, and means for preventing relative rotation of the piston and cylinder.

2. A method of determining the pressure of a road vehicle wheel on the road surface, which consists in supporting the axle at two points between the wheels and equally spaced from the center of the axle, and measuring the supporting force adjacent the wheel the bearing pressure of which is to be determined.

Signed by me at Baltimore, Maryland, this 5th day of August, 1919.

FREDERICK J. TROLL.

Witnesses:
EMMA AHLSLEGER,
PORTER H. FLAUTT.